US012085725B2

(12) United States Patent
Ono et al.

(10) Patent No.: US 12,085,725 B2
(45) Date of Patent: Sep. 10, 2024

(54) HEAD-MOUNTED DISPLAY APPARATUS

(71) Applicant: SEIKO EPSON CORPORATION, Tokyo (JP)

(72) Inventors: Takehiro Ono, Chino (JP); Wataru Sakuma, Suwa (JP); Nobuhiko Yokoo, Shiojiri (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/451,130

(22) Filed: Aug. 17, 2023

(65) Prior Publication Data
US 2024/0061261 A1 Feb. 22, 2024

(30) Foreign Application Priority Data

Aug. 18, 2022 (JP) .................. 2022-130355

(51) Int. Cl.
G02B 27/01 (2006.01)
(52) U.S. Cl.
CPC .. G02B 27/0176 (2013.01); G02B 2027/0169 (2013.01); G02B 2027/0178 (2013.01)
(58) Field of Classification Search
CPC ................................. G02B 27/0176
USPC .............................................. 345/8
See application file for complete search history.

(56) References Cited

U.S. PATENT DOCUMENTS

| 10,823,969 B1* | 11/2020 | Hoover | H01M 10/653 |
| 11,703,923 B2* | 7/2023 | Mou | G06F 1/203 |
| | | | 361/679.46 |
| 2008/0219025 A1* | 9/2008 | Spitzer | G02B 27/017 |
| | | | 362/614 |
| 2015/0185483 A1 | 7/2015 | Hiraide | |
| 2016/0363795 A1* | 12/2016 | Jeon | G02F 1/1339 |
| 2019/0303086 A1* | 10/2019 | Nagayama | H05K 5/0017 |

FOREIGN PATENT DOCUMENTS

JP 2015126336 7/2015

* cited by examiner

Primary Examiner — Calvin C Ma
(74) Attorney, Agent, or Firm — JCIPRNET

(57) ABSTRACT

A display device includes a frame supporting a first display unit and a second display unit. A substrate placement unit includes a first substrate placement unit located above the first display unit and a second substrate placement unit located above the second display unit. A video-image substrate at which a video-image processing circuit is mounted is disposed at one of the first substrate placement unit or the second substrate placement unit. The video-image processing circuit is configured to output a video image to the first display element and the second display element. A first drawing-out portion at which the first cable is drawn out is provided at one surface of the video-image substrate, and a second drawing-out portion at which the second cable is drawn out is provided at the other surface of the video-image substrate.

12 Claims, 8 Drawing Sheets

HEAD-MOUNTED DISPLAY APPARATUS

The present application is based on, and claims priority from JP Application Serial Number 2022-130355, filed on Aug. 18, 2022, the disclosure of which is hereby incorporated by reference herein in its entirety.

BACKGROUND

1. Technical Field

The present disclosure relates to a head-mounted display apparatus.

2. Related Art

Typically, display devices are known that are coupled to a cable configured to output a video-image signal. For this type of display devices, it is conceivable to improve the complexity in routing of cables. For example, a virtual-image display device disclosed in JP-A-2015-126336 includes a pair of left and right video-image elements, a cable used to output a signal to the video-image elements, and a cover covering the cable, in which the cover extends along a frame, and the cable is integrated.

As described in JP-A-2015-126336, display devices worn at the head of a user include left and right display elements that are independent of each other. When cables are integrated in this type of display devices, wire coupling is performed to the two display elements. Thus, wiring lines within the cover or frame of the display device tend to be complicated. For this reason, a method of improving the routing of the wiring lines within the display device has been desired.

SUMMARY

An aspect of the present disclosure is a display device including a first display unit including a first display element, a second display unit including a second display element, and a frame supporting the first display unit and the second display unit, in which the frame includes a substrate placement unit at which a printed wired board is disposable, the substrate placement unit includes a first substrate placement unit located above the first display unit, and a second substrate placement unit located above the second display unit, a video-image substrate at which a video-image processing circuit is mounted is disposed at one of the first substrate placement unit or the second substrate placement unit, the video-image processing circuit being configured to output a video image to the first display element and the second display element, a first cable coupled to the first display element and a second cable coupled to the second display element are coupled to the video-image substrate, a first drawing-out portion at which the first cable is drawn out is provided at one surface of the video-image substrate, and a second drawing-out portion at which the second cable is drawn out is provided at the other surface of the video-image substrate.

DESCRIPTION OF EMBODIMENTS

Hereinafter, embodiments will be described with reference to the drawings.

1. First Embodiment 1-1. Configuration of HMD

Figure 1:
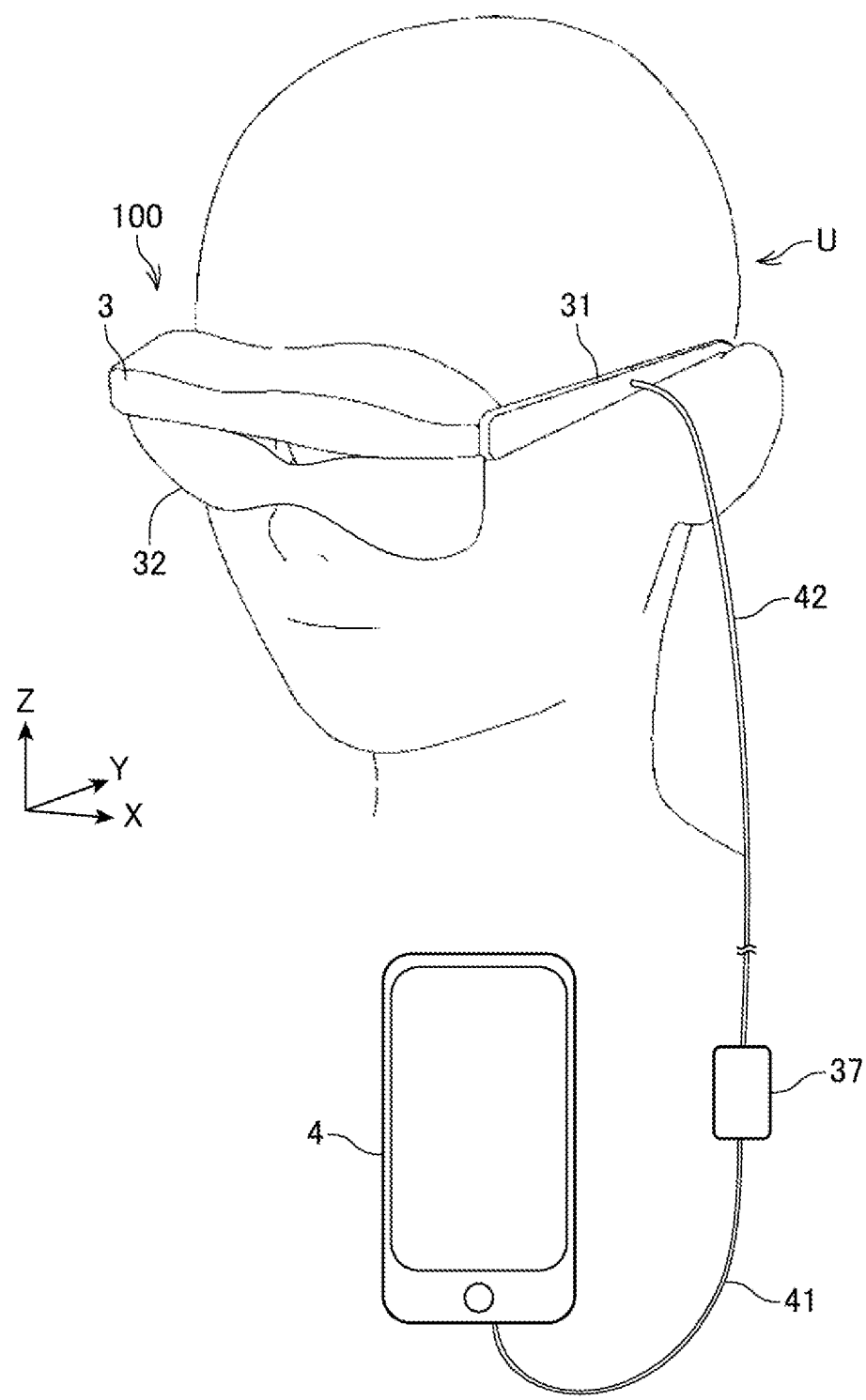
FIG. 1 is a perspective view illustrating a state where an HMD according to a first embodiment is in use.

FIG. 1 is a perspective view illustrating a state where an HMD 100 according to a first embodiment is in use. The HMD 100 is a head-mounted display apparatus worn at the head of a user U. The HMD 100 is a transparent type display device that enables a user to visually recognize a virtual image and directly visually recognize the outside scene at the same time. The outside scene is a scene of the outside of the user U who wears the HMD 100, and refers to a scene of a real space that the user U is able to visually recognize with the naked eyes even in a state where the user U does not wear a display unit 20. The user U represents a user of the HMD 100, and is also referred to as an operator. The HMD stands for a head-mounted display. The HMD 100 corresponds to one example of a display device.

In order to clearly indicate directions relative to the HMD 100, the X direction, the Y direction, and the Z direction are indicated in FIG. 1 and in each of the drawings that will be described later. The X-axis, the Y-axis, and the Z-axis constitute an orthogonal coordinate system. The X direction is a lateral direction in which both eyes of the user U who wears the HMD 100 are arranged, and corresponds to a left-right direction. More specifically, the X direction is a direction from the right of the user U toward the left. The Y direction corresponds to a front-rear direction for the user U, and more specifically, is a direction from the front of the user U toward the rear. The Z direction is a direction perpendicular to the lateral direction in which both eyes of the user U are arranged, and corresponds to the up-down direction of the user U. More specifically, the Z direction is an upward direction. The Z direction corresponds to the vertical direction.

The HMD 100 includes an outer packaging 3. The outer packaging 3 is an eyeglasses-shaped main body, and includes a pair of left and right arm portions 31, and a nose pad (not illustrated). The outer packaging 3 is held by ears of the user U through the arm portions 31, and is also held by the nose of the user U through the nose pad.

As will be described later with reference to FIG. 3, the HMD 100 includes a right display unit 20R located in front of the right eye of the user U, and a left display unit 20L located in front of the left eye of the user U. The HMD 100 is configured such that the right display unit 20R causes the right eye of the user U to visually recognize a virtual image, and the left display unit 20L causes the left eye of the user U to visually recognize a virtual image, thereby displaying an image or a video image. The right display unit 20R corresponds to one example of a first display unit, and the left display unit 20L corresponds to one example of a second display unit.

The outer packaging 3 includes a cover 32. The cover 32 is located on the outer side of the right display unit 20R and the left display unit 20L, and is configured to reduce or adjust the amount of outside light incident on the right display unit 20R and the left display unit 20L.

The HMD 100 includes an interface box 37. The interface box 37 functions as an external interface used to couple a device that outputs a video-image signal. The device that outputs a video-image signal is, for example, an information terminal device such as a personal computer or a smartphone. FIG. 1 illustrates an example in which a smartphone 4 is coupled to the interface box 37 through a cable 41. In this configuration, a signal including a video-image signal is inputted from the smartphone 4 through the cable 41 into the interface box 37.

The interface box 37 is coupled through the cable 42 to a circuit accommodated in the outer packaging 3.

1-2. Circuit Configuration of HMD

Figure 2:
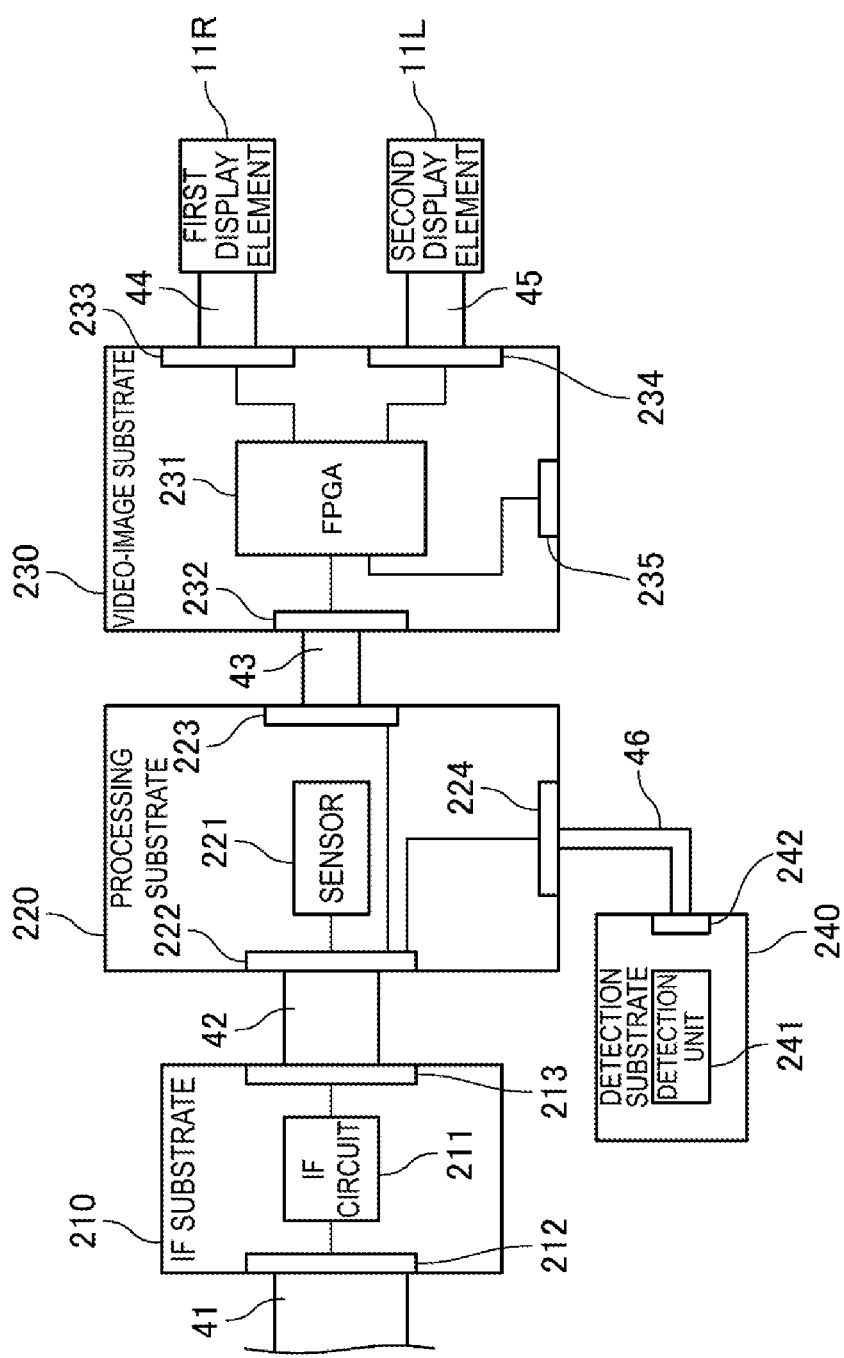
FIG. 2 is a block diagram illustrating a circuit configuration of the HMD.

FIG. 2 is a block diagram illustrating the circuit configuration of the HMD 100.

The HMD 100 includes an interface (IF) substrate 210, a processing substrate 220, and a video-image substrate 230. The IF substrate 210 is accommodated in the interface box 37. An IF circuit 211, a conductive connector 212, and a conductive connector 213 are mounted at the IF substrate 210.

The conductive connector 212 is a coupling terminal to which the cable 41 is coupled, and is, for example, a Universal Serial Bus (USB) Type-C conductive connector. The conductive connector 213 is a coupling terminal to which a cable 42 is coupled. As with the conductive connector 212, the conductive connector 213 may employ a USB Type-C conductive connector or may be a conductive connector conforming to another standard.

The IF circuit 211 performs reception and transmission of a video-image signal through the cable 41 and the cable 42. In addition, the IF circuit 211 performs, through the cable 41, reception and transmission of a detected value from a sensor 221 mounted at the processing substrate 220 or the like. The IF substrate 210 has a relay function of coupling the smartphone 4 to each component of the video-image substrate 230 or the like, and hence, can be called a relay substrate.

The sensor 221, a conductive connector 222, a conductive connector 223, and a conductive connector 224 are mounted at the processing substrate 220. The sensor 221 includes, for example, an illuminance sensor configured to detect the brightness of the peripheral environment of the HMD 100, a motion sensor configured to detect motion of the HMD 100, and a global navigation satellite system (GNSS). The motion sensor includes, for example, an acceleration sensor, an angular velocity sensor, a magnetic field sensor, or a sensor unit in which these sensors are integrated. The sensor 221 may include other sensors such as a temperature sensor.

The sensor 221 outputs the detected value through the cable 42 to the IF circuit 211. The IF circuit 211 outputs, through the cable 41, the detected value inputted from the sensor 221. In addition, a video-image signal outputted by the IF circuit 211 through the cable 42 is transmitted from the conductive connector 222 to the conductive connector 223, and is outputted to the video-image substrate 230 through a cable 43 coupled to the conductive connector 223.

The conductive connector 224 is an external coupling terminal used to couple an external substrate different from the processing substrate 220. A detection substrate 240 is coupled to the conductive connector 224, for example, through a cable 46. A detection unit 241 and a conductive connector 242 are mounted at the detection substrate 240. The detection unit 241 may be a sensor similar to the sensor 221 or may be a camera. The detection unit 241 outputs a detected value or captured image data from the conductive connector 242 through the cable 46 to the processing substrate 220. At the processing substrate 220, the detected value and the captured image data inputted into the conductive connector 242 are outputted to the conductive connector 222 through the cable 42.

When the detection unit 241 is mounted as a functional component of the HMD 100, the detection substrate 240 is accommodated in the outer packaging 3 or is provided outside of the outer packaging 3. In other words, the detection substrate 240 and the cable 46 are mounted at the HMD 100 as necessary, and it may be possible to employ a configuration in which the HMD 100 does not include the detection substrate 240.

A field-programmable gate array (FPGA) 231, a conductive connector 232, a conductive connector 233, a conductive connector 234, and a conductive connector 235 are mounted at the video-image substrate 230. The FPGA 231 is a processing circuit configured to process a video-image signal. The FPGA 231 corresponds to one example of a video-image processing circuit. The configuration in which the FPGA 231 is mounted as a circuit that processes a video-image signal is only one example, and it is possible to employ a device other than the FPGA, provided that this device is a processor having a signal processing function. The conductive connector 233 corresponds to one example of a first drawing-out portion. The conductive connector 234 corresponds to one example of a second drawing-out portion.

The conductive connector 232 is coupled to the cable 43, and receives a video-image signal transmitted through the cable 43. The cable 43 corresponds to one example of a video-image cable. The FPGA 231 generates a video-image signal of a video image displayed by the right display unit 20R and the left display unit 20L, based on the video-image signal received through the conductive connector 232. The FPGA 231 outputs a video-image signal for the right display unit 20R from the conductive connector 233 to a first display element 11R. In addition, the FPGA 231 outputs a video-image signal for the left display unit 20L from the conductive connector 234 to the second display element 11L.

Furthermore, it may be possible to employ a configuration in which an external device configured to output a video-image signal is directly coupled to the video-image substrate 230. This includes a configuration in which the HMD 100 does not include the IF substrate 210 or the processing substrate 220, for example. In this case, in place of the IF substrate 210 and the processing substrate 220, conversion from the cable 41 into the cable 43 is performed by a conversion substrate (not illustrated). A video-image signal is inputted into the video-image substrate 230 through the cable 43.

The conductive connector 233 is coupled through the cable 44 to the first display element 11R that the right display unit 20R includes. The conductive connector 234 is coupled through the cable 45 to the second display element 11L that the left display unit 20L includes. The cables 44 and 45 are made of a flexible printed circuit (FPC) cable that will be described later. The conductive connectors 233 and 234 are coupling terminals corresponding to the FPC cables. The cable 44 corresponds to one example of a first cable, and the cable 45 corresponds to one example of a second cable.

The first display element 11R is a device configured to output image light based on the video-image signal, and is, for example, comprised of an organic light-emitting diode (OLED). The second display element 11L is configured in a manner similar to the first display element 11R. The first display element 11R and the second display element 11L are not limited to an organic EL display, and it may be possible to replace them with a display device using an inorganic EL, an organic LED, an LED array, a laser array, a quantum dot light-emitting element, or the like. Furthermore, the first display element 11R and the second display element 11L are not limited to an image-light generating device of a self-light emission type. These elements may be configured with an LCD or other light modulating elements, and the light modulating element may be illuminated by a light source such as a backlight to form an image. In place of the LCD, a liquid crystal on silicon (LCOS, LCoS is a trade name) or a digital micro-mirror device or the like may be used for the display element 11.

The conductive connector 235 is coupled to the FPGA 231. The conductive connector 235 is a terminal used for programming of the FPGA 231 or the like.

The HMD 100 may be configured without the IF substrate 210, the processing substrate 220, or the detection substrate 240 being provided. That is, the IF substrate 210, the processing substrate 220, and the detection substrate 240 are optional in the HMD 100, and the video-image substrate 230 can achieve the function of displaying a video image by the right display unit 20R and the left display unit 20L.

The IF substrate 210 may be configured to receive power supply through the cable 41 from the smartphone 4 or the like. In this case, power may be supplied from the IF substrate 210 through the cable 42 to the processing substrate 220 and the video-image substrate 230. Furthermore, the video-image substrate 230 may include a power supply cable in addition to the cables 44 and 45, and may supply power for the first display element 11R and the second display element 11L through the power supply cable.

1-3. Configuration of Video-image Display Unit

Figure 3:
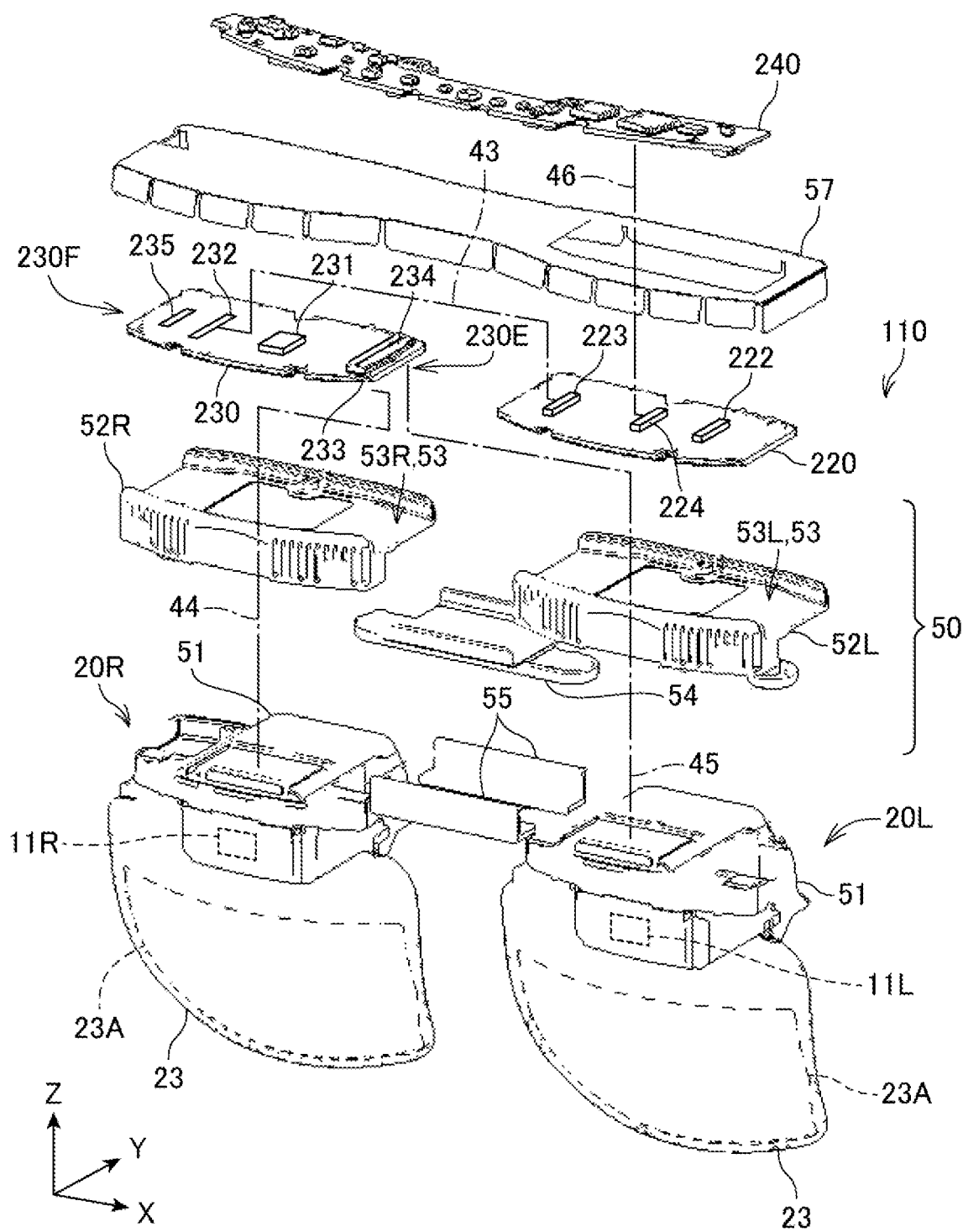
FIG. 3 is an exploded perspective view of a display-unit main body.

FIG. 3 is an exploded perspective view of a display-unit main body 110.

The right display unit 20R and the left display unit 20L are provided at the display-unit main body 110 independently of each other. The right display unit 20R includes a display unit case 51 configured to accommodate an optical element or the like. The display unit case 51 accommodates, for example, the first display element 11R. The right display unit 20R includes a see-through mirror 23. The see-through mirror 23 allows the outside light to pass through, and also reflects in a reflection region 23A, toward the right eye of the user U, image light outputted from the display unit case 51. As with the right display unit 20R, the left display unit 20L includes the display unit case 51 configured to accommodate an optical element such as the second display element 11L, and also includes the see-through mirror 23.

The display unit case 51 of the right display unit 20R and the display unit case 51 of the left display unit 20L are coupled to each other through coupling members 54 and 55. The coupling member 54 and the coupling member 55 sandwich end portions of the two display unit cases 51 from above and below to fix them.

A substrate holder 52R is attached above the right display unit 20R. Similarly, a substrate holder 52L is attached above the left display unit 20L. The substrate holder 52R and the substrate holder 52L are each fixed to an upper portion of the display unit case 51.

The substrate holders 52R and 52L and the coupling members 54 and 55 constitute a frame 50 supporting the right display unit 20R and the left display unit 20L. That is, the frame 50 couples the two display unit cases 51 to each other and supports the two display unit cases 51, thereby constituting the display-unit main body 110.

The substrate holder 52R and the substrate holder 52L each include a substrate placement unit 53. Specifically, a first substrate placement unit 53R that is a recessed portion that can accommodate the processing substrate 220 and the video-image substrate 230 is formed at the upper surface of the substrate holder 52R. In addition, a second substrate placement unit 53L that is a recessed portion that can accommodate the processing substrate 220 and the video-image substrate 230 is formed at the upper surface of the substrate holder 52L. When the first substrate placement unit 53R and the second substrate placement unit 53L are not separately treated, they are referred to as a substrate placement unit 53.

A shield member 57 is disposed extending over and above the first substrate placement unit 53R and the second substrate placement unit 53L. The shield member 57 is a plate member made of a magnetic body such as a metal, and functions as an electromagnetic shield between a printed wired board accommodated in the substrate placement unit 53 and a printed wired board disposed above the shield member 57.

The present embodiment provides a configuration example in which the video-image substrate 230 is disposed at the first substrate placement unit 53R, and the processing substrate 220 is disposed at the second substrate placement unit 53L. In addition, in the present embodiment, the detection substrate 240 is disposed above the shield member 57. An opening is formed in the shield member 57. For example, the cable 46 coupling the processing substrate 220 to the processing substrate 220 is installed extending through this opening of the shield member 57.

1-4. Configuration of Optical System

Figure 4:
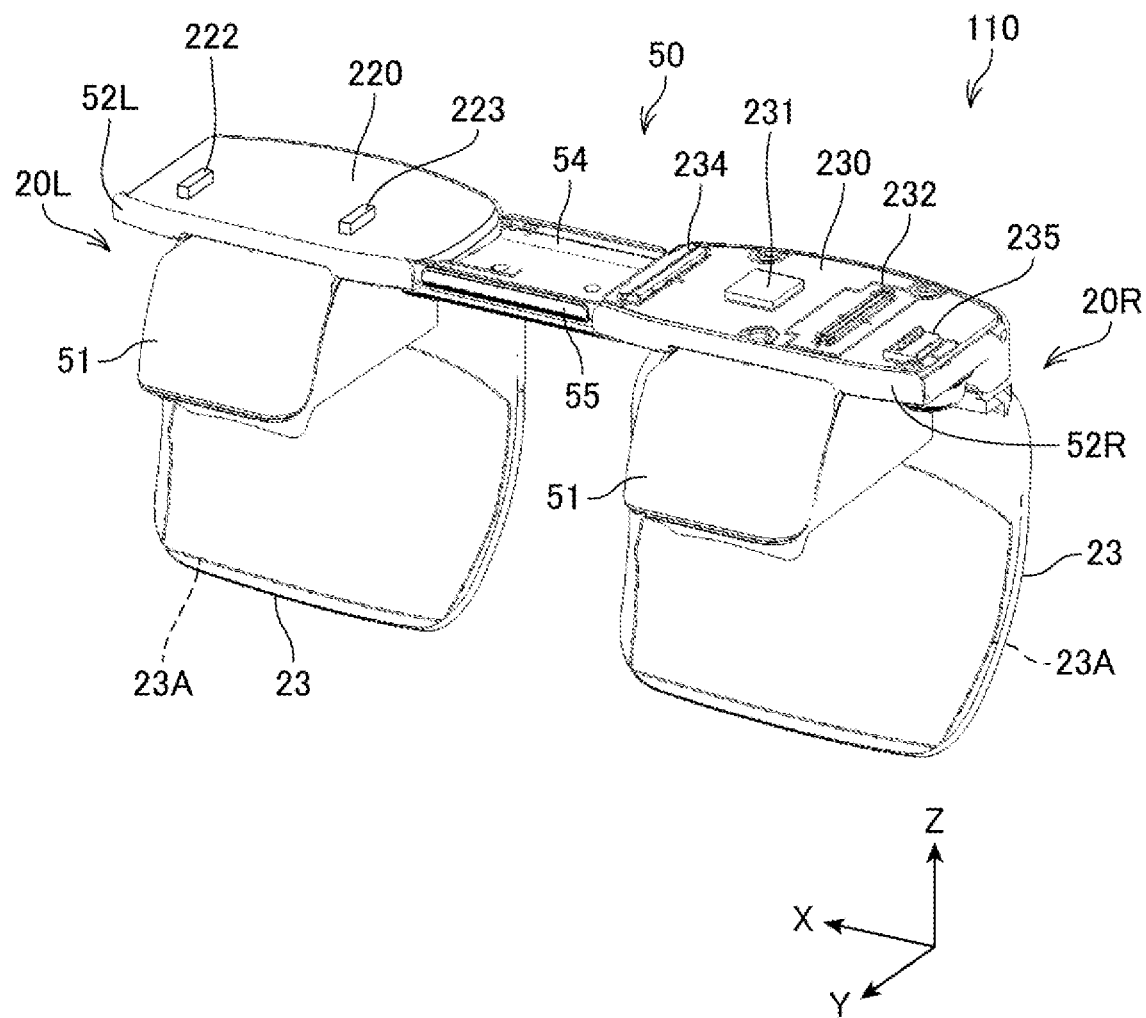
FIG. 4 is a perspective view of the display-unit main body.
Figure 5:
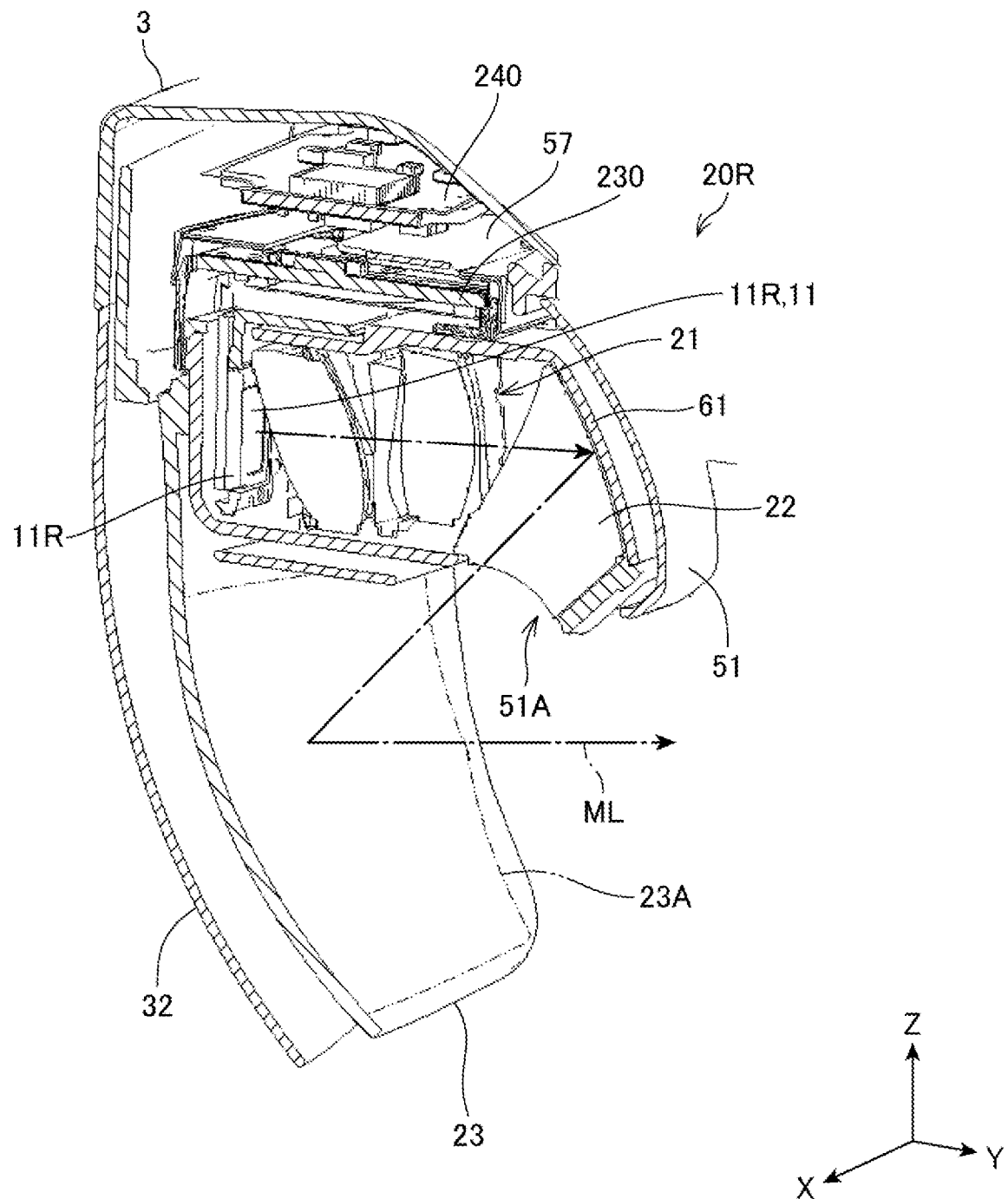
FIG. 5 is a cross-sectional view of the HMD.
Figure 6:
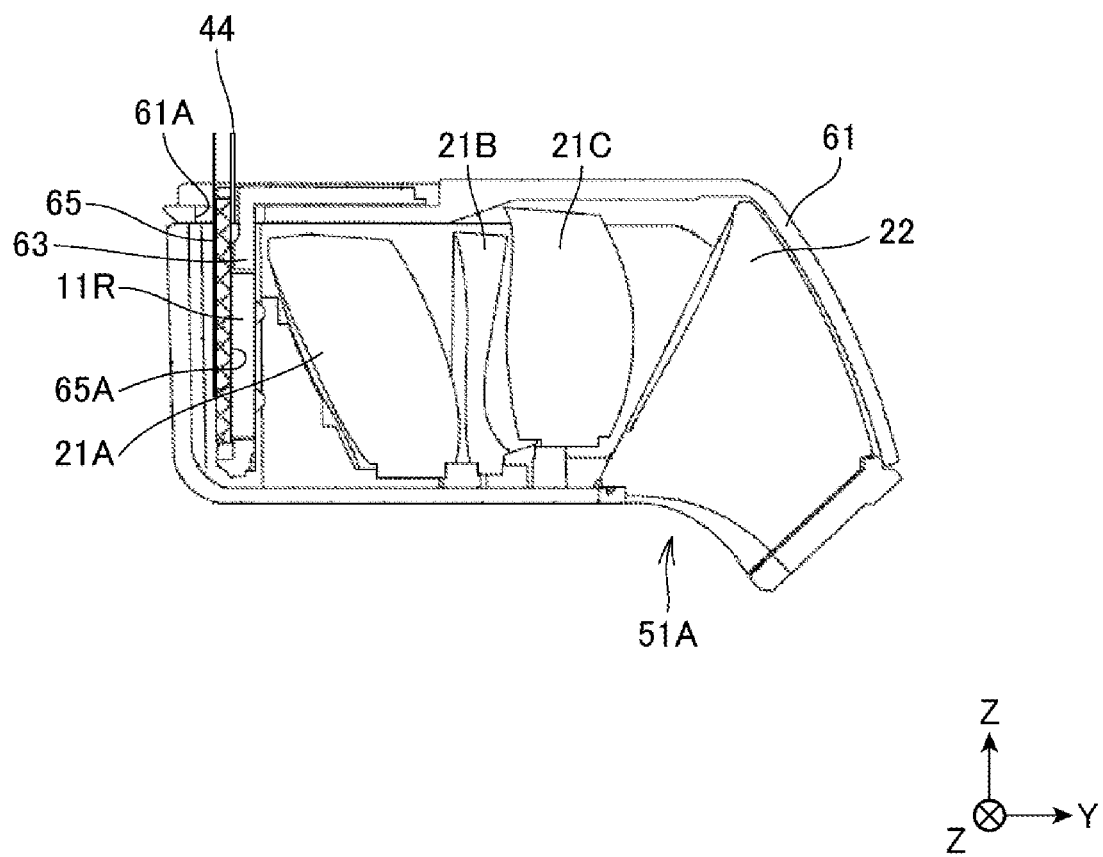
FIG. 6 is a cross-sectional view of main components of a right display unit.

FIG. 4 is a perspective view of the display-unit main body 110, and is a diagram as viewed from a side facing to the eyes of the user U. FIG. 5 is a cross-sectional view of the HMD 100, and illustrates a cross section taken along a plane including the Y-axis and the Z-axis at a position that overlaps with the right display unit 20R. FIG. 6 is a cross-sectional view of the main components of the right display unit 20R. The configuration of the optical system of the HMD 100 will be described with reference to FIGS. 4, 5, and 6.

As illustrated in FIG. 4, the right display unit 20R and the left display unit 20L are mounted with a concave surface of the see-through mirror 23 that has a curved surface facing an eye of the user U.

As illustrated in FIG. 5, the first display element 11R, a projection lens 21, and a prism mirror 22 are accommodated in the display unit case 51. The projection lens 21 is a group of lenses comprised of a plurality of lenses. The first display element 11R, the individual lenses that constitute the projection lens 21, and the prism mirror 22 are fixed within the display unit case 51 in a state of being aligned with each other. The display unit case 51 is an outer packaging made of synthetic resin having light-blocking property or a metal. The display unit case 51 includes an opening 51A.

In the right display unit 20R, the display unit case 51 is held in a state of being hung from the substrate holder 52R.

The cable 44 extending from the video-image substrate 230 to the first display element 11R is coupled to the first display element 11R from the upper portion of the display unit case 51.

In addition, as will be described later, the left display unit 20L is configured to be symmetrical in the left-right direction with the right display unit 20R. In the left display unit 20L, the display unit case 51 is held in a state of being hung from the substrate holder 52L. The cable 45 extending from the video-image substrate 230 to the second display element 11L is coupled to the second display element 11L from the upper portion of the display unit case 51.

As illustrated in FIG. 6, the projection lens 21 includes a first lens 21A, a second lens 21B, and a third lens 21C. The first lens 21A is disposed facing the first display element 11R.

The first display element 11R forms a color still image or a video on the two-dimensional display surface based on a video-image signal supplied from the video-image substrate 230. A driving circuit (not illustrated) configured to drive the first display element 11R based on the video-image signal may be provided at the first display element 11R. In FIG. 5, the optical path of the image light is indicated by a reference sign ML.

In the projection lens 21, the image light ML emitted from the display element 11 is focused into a state close to a collimated light beam through the first lens 21A, the second lens 21B, and the third lens 21C. The prism mirror 22 causes the image light ML incident on the prism mirror 22 through the projection lens 21 to be emitted in a direction reverse to the light incident direction, that is, the image light ML is returned in a direction inclined relative to the first display element 11R as viewed from the prism mirror 22. The returned image light ML is incident on the see-through mirror 23 through the opening 51A.

In this manner, the right display unit 20R is configured to guide the image light ML in the Z direction to allow the right eye of the user U to visually recognize a video image. The right display unit 20R employs light guiding in the vertical direction. This similarly applies to the left display unit 20L. This makes it easy to make a configuration in which the right display unit 20R and the left display unit 20L are display units independent of each other, and are arranged alongside in the left-right direction.

The see-through mirror 23 is a sheet-like reflection optical member having a curved shape and functioning as a concave front-surface mirror. The see-through mirror 23 reflects the image light ML from the prism mirror 22 to enlarge an intermediate image formed at the light emission side of the prism mirror 22. The image light ML reflected at the see-through mirror 23 is incident on the right eye of the user U, allowing the user U to visually recognize a virtual image. The see-through mirror 23 is a transmissive-type reflection element made, for example, of synthetic resin or glass, and a reflection film or an anti-reflection film is formed through coating.

The first display element 11R, the projection lens 21, and the prism mirror 22 can be called a projection optical system configured to project the image light ML. In addition, the projection lens 21, the prism mirror 22, and the see-through mirror 23 can be called an image-formation optical system.

The first display element 11R, together with the projection lens 21 and the prism mirror 22, is accommodated in a lens case 61, as illustrated in FIG. 6. Within the lens case 61, the first display element 11R is disposed at a position closest to the see-through mirror 23. Specifically, with in the lens case 61, a display element holder 63 supporting the first display element 11R is disposed. In addition, a heat dissipation member 65 and the first display element 11R are accommodated between the display element holder 63 and the projection lens 21. The heat dissipation member 65 is a plate member made of metal, and is joined at a contact surface 65A thereof to the first display element 11R. Heat generated by the first display element 11R is transferred from the contact surface 65A to the heat dissipation member 65, and is dissipated.

Within the lens case 61, a gap is formed at the back surface of the first display element 11R, and through this gap, the cable 44 is coupled to the first display element 11R. The cable 44 is installed extending through an insertion opening 61A of the lens case 61, and extends upward from the insertion opening 61A to be coupled to the video-image substrate 230.

The heat dissipation member 65 is disposed in a gap provided at the back surface of the first display element 11R, and extends upward through this gap to be coupled to the substrate holder 52R. Thus, heat that the heat dissipation member 65 receives from the first display element 11R is transmitted to the substrate holder 52R.

The substrate holder 52R is made of an alloy including one or more of magnesium, manganese, aluminum, or titanium. Thus, the substrate holder 52R has excellent thermal conductive property and thermal dissipation property. This makes it possible to rapidly dissipate the heat generated by the first display element 11R through the heat dissipation member 65.

The left display unit 20L is configured to be symmetrical in the left-right direction with the right display unit 20R. The second display element 11L, together with the projection lens 21 and the prism mirror 22, are accommodated in the lens case 61. Within the lens case 61, the second display element 11L is disposed at a position closest to the see-through mirror 23. Specifically, within the lens case 61, a display element holder 63 supporting the second display element 11L is disposed. In addition, the heat dissipation member 65 and the second display element 11L are accommodated between the display element holder 63 and the projection lens 21. The heat dissipation member 65 is joined at a contact surface 65A thereof to the second display element 11L. Heat generated by the second display element 11L is transferred from the contact surface 65A to the heat dissipation member 65, and is dissipated.

Within the lens case 61, a gap is formed at the back surface of the second display element 11L, and through this gap, the cable 45 is coupled to the second display element 11L. The cable 45 is installed extending through an insertion opening 61A of the lens case 61, and extends upward from the insertion opening 61A to be coupled to the video-image substrate 230.

The heat dissipation member 65 is disposed in a gap provided at the back surface of the second display element 11L, and extends upward through this gap to be coupled to the substrate holder 52L. Thus, heat that the heat dissipation member 65 receives from the second display element 11L is transmitted to the substrate holder 52L.

The substrate holder 52L is made of an alloy including one or more of magnesium, manganese, aluminum, or titanium. Thus, the substrate holder 52L has excellent thermal conductive property and thermal dissipation property. This makes it possible to rapidly dissipate the heat generated by the second display element 11L through the heat dissipation member 65.

Although not illustrated, the left display unit 20L is configured in a manner similar to the right display unit 20R illustrated in FIG. 5. More specifically, the left display unit 20L and the right display unit 20R are configured to be symmetrical in the left-right direction.

1-5. Configuration of Substrate

Figure 7:
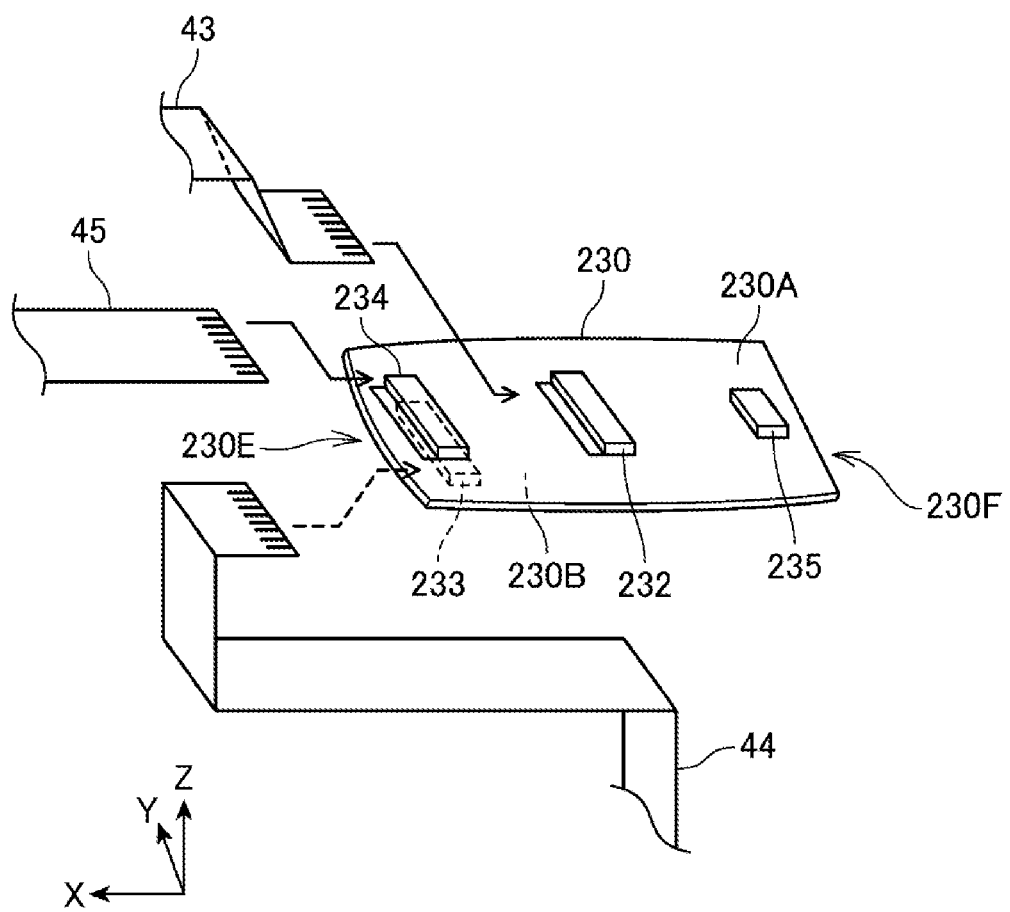
FIG. 7 is a perspective view of main components illustrating a state where cables are coupled at a video-image substrate.

FIG. 7 is a perspective view of the main components in a state where cables are coupled at the video-image substrate 230. The configuration of the video-image substrate 230 will be described with reference to FIGS. 4 and 7. Note that, although the FPGA 231 is mounted at the video-image substrate 230, illustration of the FPGA 231 is omitted in FIG. 7.

An element or a conductive connector can be mounted at both sides of the video-image substrate 230. As illustrated in FIG. 4, conductive connectors 232, 234, and 235 are mounted at the upper surface of the video-image substrate 230 in a state where the video-image substrate 230 is provided at the first substrate placement unit 53R. The surface where the conductive connectors 232, 234, and 235 are mounted is referred to as a first surface 230A. For example, the FPGA 231 is mounted at the first surface 230A, as illustrated in FIG. 4.

The conductive connector 233 is mounted at a second surface 230B. The second surface 230B is a surface that is opposed from the first surface 230A, and is a rear surface on the assumption that the first surface 230A is a front surface. As illustrated in FIG. 7, the conductive connector 233 is disposed at a position that overlaps with that of the conductive connector 234 in plan view. Specifically, when the first surface 230A or the second surface 230B is viewed in plan view, the conductive connector 233 and the conductive connector 234 are disposed overlapping with each other. In other words, the conductive connector 233 is disposed at the rear side of the conductive connector 234. That is, the cable 44 coupled to the conductive connector 233 and the cable 45 coupled to the conductive connector 234 are disposed with the video-image substrate 230 interposed between the cable 44 and cable 45.

The conductive connectors 233 and 234 are provided at one end portion 230E, in the X direction, of the video-image substrate 230. The conductive connectors 233 and 234 are flat-cable conductive connectors. The cables 44 and 45 that are flat cables can be inserted into and fixed by the conductive connectors 233 and 234. The conductive connectors 233 and 234 are provided at an end portion 230E, and are provided such that the cables 44 and 45 can be inserted into the conductive connectors 233 and 234 along the X-axis from the outside of the video-image substrate 230. Thus, the cables 44 and 45 are drawn out to the outside of the video-image substrate 230 from the end portion 230E.

From the video-image substrate 230, the cable 44 is coupled to the first display element 11R accommodated in the display unit case 51 hung from the substrate holder 52R supporting the video-image substrate 230. The cable 44 is bent as illustrated in FIG. 7, and is installed between the video-image substrate 230 and the first display element 11R in a state of being accommodated in the substrate holder 52R.

In addition, from the video-image substrate 230, the cable 45 is coupled to the second display element 11L accommodated in the display unit case 51 hung from the substrate holder 52L. The cable 45 is installed extending from the video-image substrate 230 in a direction of the substrate holder 52L, being accommodated in a space formed by the coupling members 54 and 55 and the shield member 57, and extending to the second display element 11L.

The cable 44 is coupled to the first display element 11R that the right display unit 20R includes, and is used to output a video image to the first display element 11R. The cable 45 is coupled to the second display element 11L that the left display unit 20L includes, and is used to output a video image to the second display element 11L. These two flat cables are drawn out from the video-image substrate 230 while overlapping with each other in the up-down direction. One of the conductive connector 233, 234 is disposed at the end portion 230E of one of both surfaces of the video-image substrate 230, and the other of the conductive connector 233, 234 is disposed at the end portion 230E of the other of both surfaces of the video-image substrate 230. This makes it possible to minimize the thickness of a portion where the cable 44 and the cable 45 overlap with each other. Thus, it is possible to accommodate the video-image substrate 230 and the cables 44 and 45 in a small space within the outer packaging 3. In addition, the cables 44 and 45 are drawn out from the end portion 230E toward the outside of the video-image substrate 230, and hence, the member that overlaps with the cables 44 and 45 is minimized. Thus, it is possible to suppress application of external force in the thickness direction to the cables 44 and 45, which reduces the possibility that the cables 44 and 45 are damaged during assembly of the HMD 100 or during use.

Furthermore, the HMD 100 includes the right display unit 20R and the left display unit 20L that employ light guiding in the vertical direction, and these units are arranged alongside in the left-right direction. Thus, the cables 44 and 45 extending from the video-image substrate 230 to the first display element 11R and the second display element 11L are provided in the left-right direction. By disposing one of the cables 44 and 45 at one of both surfaces of the video-image substrate 230 and the other of the cables 44 and 45 at the other of both surfaces of the video-image substrate 230 with the cables 44 and 45 facing each other, it is possible to dispose the cables 44 and 45 in a more reduced space.

The conductive connector 232 is disposed substantially at the center, in the X direction, of the video-image substrate 230. The cable 43 is coupled to the conductive connector 232. The cable 43 is a cable coupling the video-image substrate 230 to the processing substrate 220. The cable 43 extends, in the X direction, toward the processing substrate 220 attached to the second substrate placement unit 53L.

In the present embodiment, the conductive connector 232 is disposed at an end portion, in the X direction, of the processing substrate 220. The cable 42 is coupled to the conductive connector 222 as described above. The conductive connector 222 is located at an end portion of the processing substrate 220 and at the left end of the outer packaging 3, and hence, it is easy to route the cable 42.

In addition, the conductive connector 235 is disposed at an end portion 230F of the video-image substrate 230.

In addition, with an opening being provided in the shield member 57, it is possible to cause the cable 46 to pass through the opening of the shield member 57 to be routed when the cable 46 is coupled to the conductive connector 224 provided at the processing substrate 220. Thus, in the configuration in which the detection substrate 240 is mounted at the HMD 100 as illustrated in FIG. 3, it is easy to route the cable 46 that couples the processing substrate 220 to the detection substrate 240.

In this manner, the HMD 100 according to the first embodiment includes: the right display unit 20R including the first display element 11R; the left display unit 20L including the second display element 11L; and the frame 50 supporting the right display unit 20R and the left display unit 20L. The frame 50 includes the substrate placement unit 53 at which a printed wired board can be disposed, and the substrate placement unit 53 includes the first substrate placement unit 53R located above the right display unit 20R and the second substrate placement unit 53L located above the left display unit 20L. The video-image substrate 230 at which the FPGA 231 serving as a video-image processing circuit is mounted is disposed at one of the first substrate placement unit 53R or the second substrate placement unit 53L, the video-image processing circuit being configured to output a video image to the first display element 11R and the second display element 11L. The cable 44 coupled to the first display element 11R and the cable 45 coupled to the second display element 11L are coupled to the video-image substrate 230. The conductive connector 233 at which the cable 44 is drawn out is provided at the first surface 230A serving as one surface of the video-image substrate 230, and the conductive connector 234 at which the cable 45 is drawn out is provided at the second surface 230B serving as the other surface of the video-image substrate 230. With this configuration, it is possible to provide, in a reduced space, the cables 44 and 45 for transmitting a video image from the video-image substrate 230 to the first display element 11R and the second display element 11L. This makes it possible to improve routing of the cables 44 and 45 within the outer packaging 3 of the HMD 100.

In addition, the function related to video-image display can be achieved by mounting the video-image substrate 230, and the IF substrate 210, the processing substrate 220, and the detection substrate 240 are optional. In this configuration, by mounting the video-image substrate 230 at one substrate holder 52R that the frame 50 includes, it is possible to achieve the video-image display function, which makes it possible to achieve the HMD 100 having improved scalability.

In addition, the cables 44 and 45 for transmitting a video image are flat cables, and the conductive connectors 233 and 234 are conductive connectors that couple the flat cables. This makes it possible to provide them in a narrower space.

2. Second Embodiment

Figure 8:
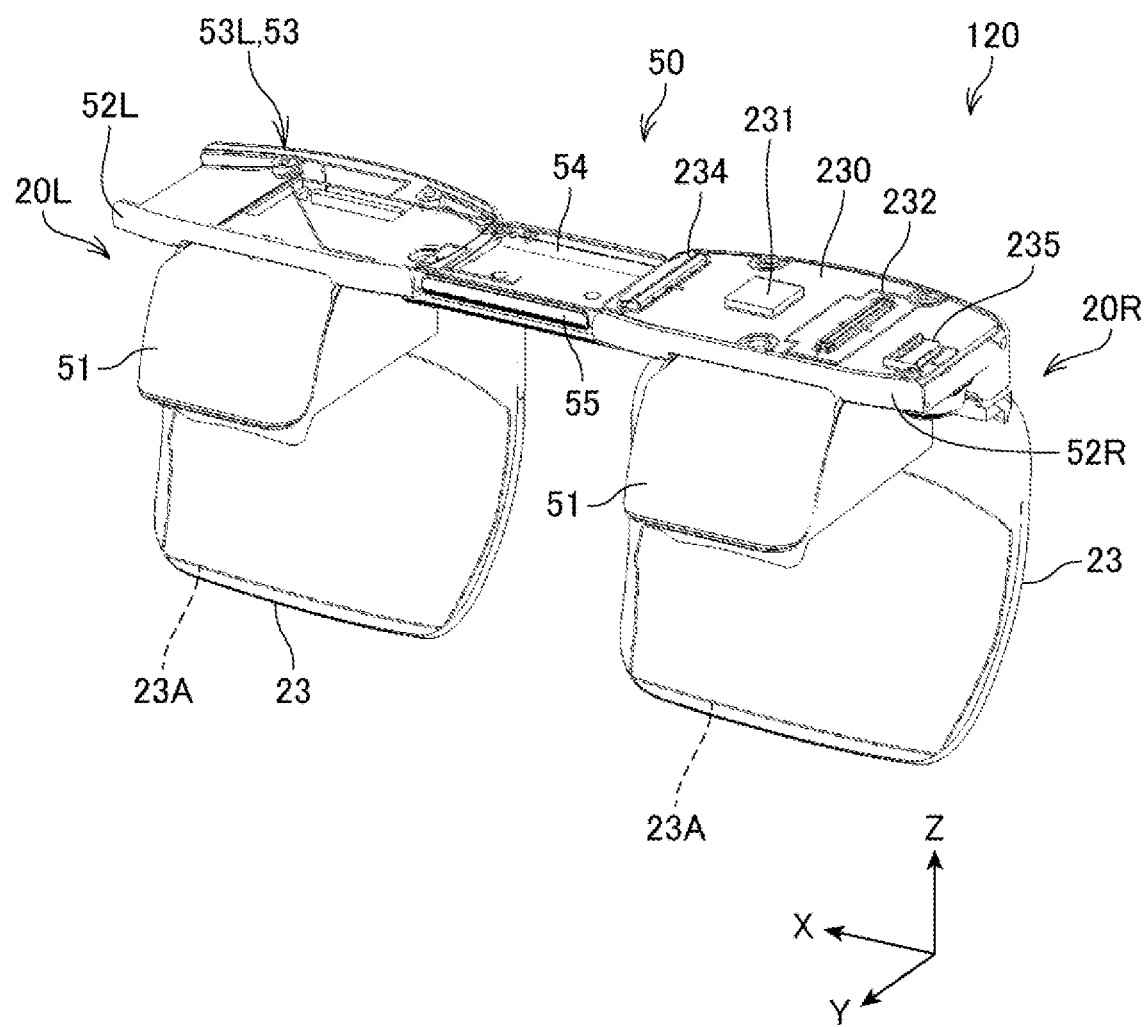
FIG. 8 is a perspective view of an HMD unit according to a second embodiment.

FIG. 8 is a perspective view of an HMD unit 120 according to a second embodiment, and is a diagram as viewed from a side facing the eyes of the user U.

The HMD unit 120 is a unit in which, of individual components that constitute the HMD 100, main components related to displaying can be sold or distributed in a mode in which the outer packaging 3 is not provided. The HMD unit 120 corresponds to the display-unit main body 110. That is, the HMD unit 120 includes the right display unit 20R, the left display unit 20L, and the frame 50. The HMD unit 120 corresponds to one example of a display device according to the present disclosure.

In the HMD unit 120, the video-image substrate 230 is attached to the substrate holder 52R. In addition, although illustration is not given, the HMD unit 120 includes the cables 44 and 45 drawn out from the conductive connectors 234 and 235 of the video-image substrate 230. The cable 44 is coupled to the first display element 11R of the right display unit 20R, and the cable 45 is coupled to the second display element 11L of the left display unit 20L.

By mounting an appropriate outer packaging at the HMD unit 120 and then coupling the cable 43 to the conductive connector 232, it is possible to cause the HMD unit 120 to function as a display device.

In the HMD unit 120, no substrate is provided at the second substrate placement unit 53L. With the function of the video-image substrate 230, the HMD unit 120 is able to cause the right display unit 20R and the left display unit 20L to display a video image. For example, when the processing substrate 220 or the detection substrate 240 is mounted as a function other than displaying of a video image, it is only necessary that a user who obtains the HMD unit 120 installs a substrate corresponding to the processing substrate 220 or the detection substrate 240.

In this manner, the HMD unit 120 comprised of main components related to video-image display of the HMD 100 can be separately distributed, and can be mounted by being incorporated into another device. By using the HMD unit 120, it is possible to easily manufacture various types of devices having a video-image display function, for example.

With the HMD unit 120, it is possible to easily route, in a small space, the cables 44 and 45 for transmitting a video image from the video-image substrate 230 to the first display element 11R and the second display element 11L. This provides an advantage in which it is possible to easily secure a space for wiring lines in a device into which the HMD unit 120 is incorporated.

3. Other Embodiments

The present disclosure is not limited to the configurations in the embodiments described above, and can be implemented in various aspects without departing from the gist of the disclosure.

In the embodiments described above, configurations have been described in which, in the HMD 100, of the first substrate placement unit 53R and the second substrate placement unit 53L, the video-image substrate 230 is disposed at the first substrate placement unit 53R. However, these configurations are merely examples. For example, it may be possible to employ a configuration in which the video-image substrate 230 is disposed at the second substrate placement unit 53L. In addition, configuration has been given in which, in the video-image substrate 230, the conductive connector 233 is disposed at the first surface 230A that faces upward and the conductive connector 234 is disposed at the second surface 230B that faces downward. However, these arrangements may be swapped.

In addition, the video-image substrate 230 may have a symmetrical shape in the left-right direction. In this case, the video-image substrate 230 is disposed not only at the first substrate placement unit 53R formed at the substrate holder 52R, and may also be disposed at the second substrate placement unit 53L of the substrate holder 52L.

In addition, the embodiments described above illustrate, as an example, a configuration in which the right display unit 20R and the left display unit 20L that are independent of each other each include the see-through mirror 23. However, a configuration may be employed in which each of the right display unit 20R and the left display unit 20L projects image light onto one large see-through mirror 23.

Furthermore, a configuration may be employed in which, in the display-unit main body 110, only one of the right display unit 20R or the left display unit 20L is provided, and the video-image substrate 230 is mounted at the substrate holder 52R or the substrate holder 52L. That is, the display device may be configured to allow only the right eye or the left eye of the user U to visually recognize a video image.

The block diagram illustrated in FIG. 2 is given as one example illustrating the main components of the HMD 100, and some components are omitted or simplified for the purpose of facilitating understanding. Thus, the block diagram is not intended to limit detailed configuration of the HMD 100.

4. Configurations Described in Embodiments

With the embodiments described above, the following configurations can be described.

Configuration 1

A display device including: a first display unit including a first display element; a second display unit including a second display element; and a frame supporting the first display unit and the second display unit, in which the frame includes a substrate placement unit at which a printed wired board is disposable, the substrate placement unit includes: a first substrate placement unit located above the first display unit and a second substrate placement unit located above the second display unit, a video-image substrate at which a video-image processing circuit is mounted is disposed at one of the first substrate placement unit or the second substrate placement unit, the video-image processing circuit being configured to output a video image to the first display element and the second display element, a first cable coupled to the first display element and a second cable coupled to the second display element are coupled to the video-image substrate, a first drawing-out portion at which the first cable is drawn out is provided at one surface of the video-image substrate, and a second drawing-out portion at which the second cable is drawn out is provided at the other surface of the video-image substrate.

With the display device according to the configuration 1, it is possible to route, in a small space, the cables coupling the first display element and the second display element to the video-image substrate. Thus, it is possible to improve routing of the cables within the display device.

Configuration 2

The display device according to Configuration 1 in which one of the first drawing-out portion and the second drawing-out portion is disposed at a position at a front surface of the video-image substrate and the other of the first drawing-out portion and the second drawing-out portion is disposed at a position at a rear surface of the video-image substrate, the positions overlapping with each other in plan view.

With the display device according to Configuration 2, it is possible to draw out one of the first cable and the second cable at a position at one of both of the front surface and the rear surface of the video-image substrate and the other of the first cable and the second cable at a position at the other of both of the front surface and the rear surface of the video-image substrate, the positions being substantially the same. This makes it possible to dispose the first cable and the second cable using a smaller space.

Configuration 3

The display device according to Configuration 1 or 2, in which the first display unit and the second display unit are disposed at the frame, and are configured to be arranged left and right in a state where the display device is in use, and the first drawing-out portion and the second drawing-out portion are disposed at one end portion, in a left-right direction, of the video-image substrate.

With the display device according to Configuration 3, it is possible to efficiently wire the first cable and the second cable from the video-image substrate to the first display unit and the second display unit, the first display unit and the second display unit being disposed so as to be arranged left and right. This makes it possible to yet further improve routing of the cables within the display device.

Configuration 4

The display device according to Configuration 3, in which a video-image cable through which the video-image processing circuit receives a video image is coupled at a position different, in a left-right direction of the video-image substrate, from that of the end portion at which the first drawing-out portion and the second drawing-out portion are provided.

With the display device according to Configuration 4, it is possible to dispose the video-image cable at a position that does not overlap with the first cable or the second cable. This makes it possible to yet further improve routing of the cables within the display device.

Configuration 5

The display device according to any one of Configurations 1 to 4, in which the first cable and the second cable are flat cables, and the first drawing-out portion and the second drawing-out portion are conductive connectors to which the flat cables are coupled.

With the display device according to Configuration 5, it is possible to dispose the first cable and the second cable constituted by flat cables by using a smaller space.

Configuration 6

The display device according to any one of Configurations 1 to 5, in which the display device is a head-mounted display apparatus including an outer packaging, the outer packaging being configured to hold the display device at a head of a user, the display device further includes: a shield member covering the first substrate placement unit and the second substrate placement unit; and a processing substrate at which a processing circuit coupled to the video-image processing circuit is mounted, and the processing substrate is disposed at, of the first substrate placement unit and the second substrate placement unit, the substrate placement unit at which the video-image substrate is not disposed.

With the display device according to Configuration 6, it is possible to dispose the video-image substrate and the processing substrate within the display device, and efficiently route the cables coupled to these substrates.

Configuration 7

The display device according to Configuration 6, in which a detection substrate at which a detection circuit is mounted is disposed above the shield member.

With the display device according to Configuration 7, it is possible to efficiently route the cables within the display device including a substrate at which the detection circuit is mounted.

Configuration 8

The display device according to any one of Configurations 1 to 7, in which the first display unit includes a substrate holder constituting the substrate placement unit, and a display unit case hung from the substrate holder, the first display element and an optical member configured to guide, in a vertical direction, image light emitted from the first display element are disposed at the display unit case, and the first cable is coupled to the first display element from an upper portion of the display unit case.

With the display device according to Configuration 8, it is possible to dispose, in a small space, the first cable coupling the first display element to the video-image substrate in a configuration in which image light emitted by the first display element is guided in the vertical direction.

Configuration 9

The display device according to Configuration 8, in which the first cable is installed from the video-image substrate to the first display element in a bent state.

With the display device according to Configuration 9, it is possible to wire the cable extending from the video-image substrate to the first display element by using a small space.

Configuration 10

The display device according to Configuration 8 or 9, in which, within the display unit case, a gap is formed at a back surface side of the first display element, and the first cable is coupled to the first display element through the gap.

With the display device according to Configuration 10, it is possible to wire the cable extending from the video-image substrate to the first display element by using a small space.

Configuration 11

The display device according to any one of Configurations 8 to 10, in which a heat dissipation member is joined at a back surface of the first display element, and the heat dissipation member passes through the gap, and is coupled to the substrate holder.

With the display device according to Configuration 11, it is possible to efficiently dissipate the heat generated by the first display element.

Configuration 12

The display device according to any one of Configurations 8 to 11, in which the substrate holder is made of an alloy including one or more of magnesium, manganese, aluminum, or titanium.

With the display device according to Configuration 12, it is possible to efficiently dissipate the heat transmitted from the first display element to the heat dissipation member.

Application of Configurations 8 to 12 is not limited to the first display unit, and it is possible to apply Configurations 8 to 12 to the second display unit. That is, it may be possible to apply one or more of Configurations 8 to 12 to the second cable coupled to the second display element that the second display unit includes.

What is claimed is:

1. A head-mounted display apparatus comprising:
   a first display unit including a first display element;
   a second display unit including a second display element; and
   a frame supporting the first display unit and the second display unit, wherein
   the frame includes a substrate placement unit at which a printed wired board is disposable,
   the substrate placement unit includes:
     a first substrate placement unit located above the first display unit; and
     a second substrate placement unit located above the second display unit,
   a video-image substrate at which a video-image processing circuit is mounted is disposed at one of the first substrate placement unit or the second substrate placement unit, the video-image processing circuit being configured to output a video image to the first display element and the second display element,
   a first cable coupled to the first display element and a second cable coupled to the second display element are coupled to the video-image substrate,
   a first drawing-out portion at which the first cable is drawn out is provided at one surface of the video-image substrate, and
   a second drawing-out portion at which the second cable is drawn out is provided at the other surface of the video-image substrate.

2. The head-mounted display apparatus according to claim 1, wherein
   one of the first drawing-out portion and the second drawing-out portion is disposed at a position at a front surface of the video-image substrate and the other of the first drawing-out portion and the second drawing-out portion is disposed at a position at a rear surface of the video-image substrate, the positions overlapping with each other in a plan view.

3. The head-mounted display apparatus according to claim 1, wherein
   the first display unit and the second display unit are disposed at the frame, and are configured to be arranged left and right in a state where the display device is in use and
   the first drawing-out portion and the second drawing-out portion are disposed at one end portion, in a left-right direction, of the video-image substrate.

4. The head-mounted display apparatus according to claim 3, wherein
   a video-image cable through which the video-image processing circuit receives a video image is coupled at a position different, in a left-right direction of the video-image substrate, from that of the end portion at which the first drawing-out portion and the second drawing-out portion are provided.

5. The head-mounted display apparatus according to claim 1, wherein
   the first cable and the second cable are flat cables, and
   the first drawing-out portion and the second drawing-out portion are conductive connectors to which the flat cables are coupled.

6. The head-mounted display apparatus according to claim 1, wherein
   the display device is a head-mounted display apparatus including an outer packaging, the outer packaging being configured to hold the display device at a head of a user,
   the display device further includes:
     a shield member covering the first substrate placement unit and the second substrate placement unit; and
     a processing substrate at which a processing circuit coupled to the video-image processing circuit is mounted, and
   the processing substrate is disposed at the substrate placement unit at which the video-image substrate is not disposed, of the first substrate placement unit and the second substrate placement unit.

7. The head-mounted display apparatus according to claim 6, wherein
   a detection substrate at which a detection circuit is mounted is disposed above the shield member.

8. The head-mounted display apparatus according to claim 1, wherein
   the first display unit includes a substrate holder constituting the substrate placement unit, and a display unit case hung from the substrate holder,
   the first display element and an optical member configured to guide, in a vertical direction, image light emitted from the first display element are disposed at the display unit case, and
   the first cable is coupled to the first display element from an upper portion of the display unit case.

9. The head-mounted display apparatus according to claim 8, wherein
   the first cable is installed from the video-image substrate to the first display element in a bent state.

10. The head-mounted display apparatus according to claim 8, wherein
    within the display unit case, a gap is formed at a back surface side of the first display element, and the first cable is coupled to the first display element through the gap.

11. The head-mounted display apparatus according to claim 10, wherein
a heat dissipation member is joined at a back surface of the first display element, and
the heat dissipation member extends through the gap, and is coupled to the substrate holder.

12. The head-mounted display apparatus according to claim 11, wherein
the substrate holder is made of an alloy including one or more of magnesium, manganese, aluminum, or titanium.

* * * * *